J. W. NEWTON.
Potato Digger and Vine Puller.
No. 83,785. Patented Nov. 3, 1868.
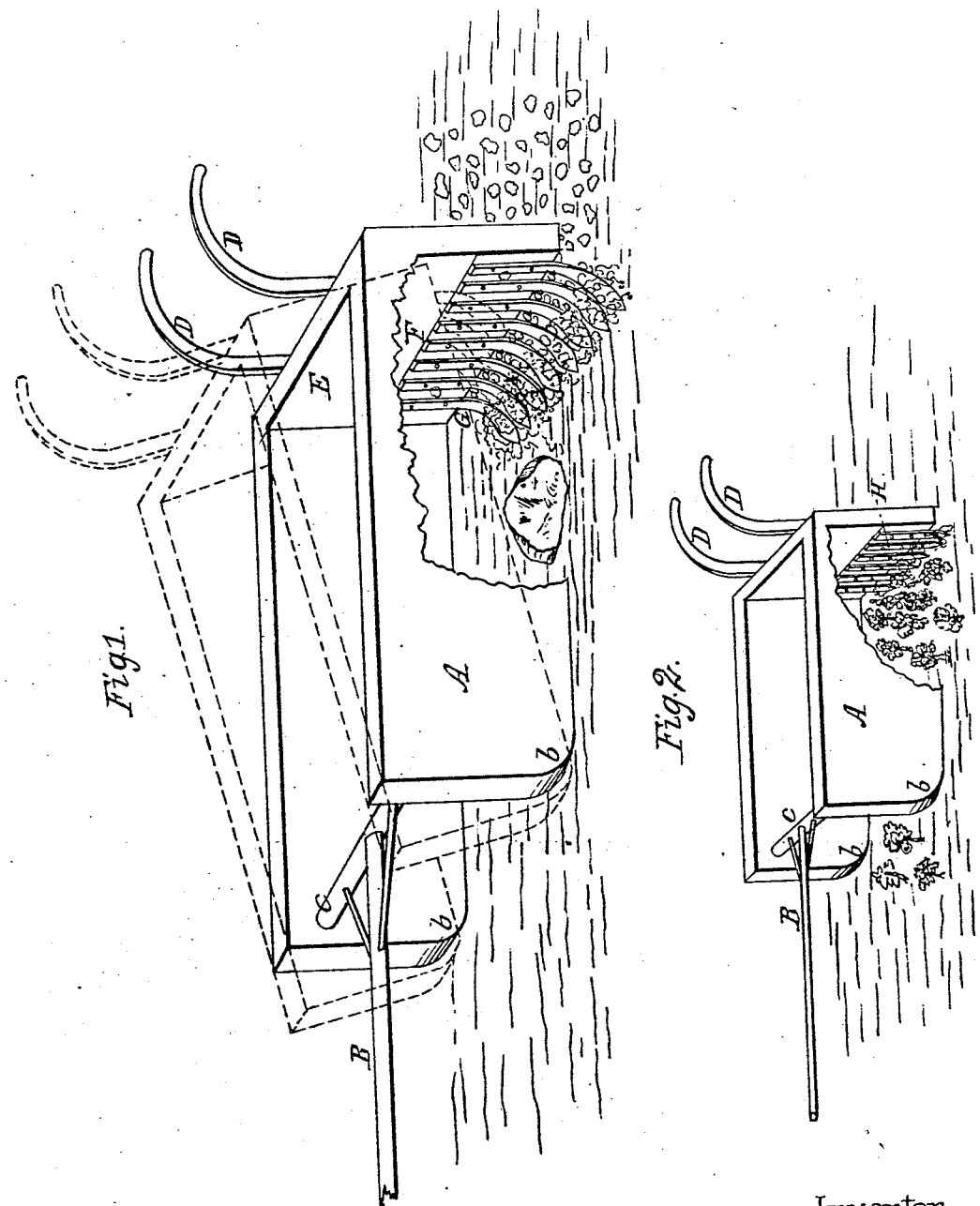

United States Patent Office.

JOHN W. NEWTON, OF GENEVA, WISCONSIN.

*Letters Patent No. 83,785, dated November 3, 1868.*

IMPROVEMENT IN POTATO-DIGGER AND VINE-PULLER.

The Schedule referred to in these Letters Patent and making part of the same.

*To all whom it may concern:*

Be it known that I, JOHN W. NEWTON, of Geneva, in the county of Walworth, and State of Wisconsin, have invented a new and useful Improvement in Potato-Diggers and Vine-Pullers; and I do hereby declare the following to be a clear and exact description of the nature thereof, sufficient to enable others skilled in the art to which my invention appertains, to fully understand and use the same, reference being had to the accompanying drawings, making part of this specification, in which—

Figures 1 and 2 are perspective views of my improvements.

Similar letters of reference indicate corresponding parts in the two figures.

My invention is a simple device for pulling potato-vines and digging potatoes, and consists in applying to a frame a series of removable teeth, which are so constructed as to dig the potatoes, and cause them to be cleared from the earth, and drop on top thereof, so as to be readily gathered.

Another great feature of my invention consists in hinging the draught-pole to the frame, so that the hinge will form a pivot, by which the frame may be tilted, and the teeth cleared of stones and other obstruction, without necessarily lifting the whole weight of the device.

A series of teeth may be applied to this frame when the other teeth are removed, so as to form a vine-puller, all of which will be hereinafter more fully described.

In the drawings—

A represents a three-sided frame, constructed of wood or metal, and made sufficiently heavy for the purpose intended.

The open part of the frame is in front, and to it is pivoted the draught-pole B, by means of a rock-bar, C, which is connected to the pole, and has its ends journalled in the sides of the frame A.

To the rear of the frame, I secure handles D, which may be of any shape, but by preference of curved form, so that the driver has plenty of room for walking, while driving the horses and operating the device.

To the inner side of the back piece E, of the frame, I secure, by means of bolts or other fastenings, a metal plate, F, so that the plate is firmly held in place, but readily removable when desired.

A series of curved teeth, G, is riveted to this plate F, and projects below the bottom of the frame. Each tooth consists of a curved piece of metal, gradually tapering from one end to the other, the widest part being below, so that when the teeth are in position, the widest spaces are at parts of the teeth just below the bottom of the frame, as shown at $a$, fig. 1. The forward ends of the lower sides of the frame A are rounded, as at $b$, for a purpose hereinafter to be described.

The horses are to be attached to the pole B, and are then started. The driver takes hold of the handles D, and guides the motion of the horses and the digger. The teeth now penetrate the ground, and pass under the potatoes, which are soon brought to the surface, owing to the curved shape of the teeth, and the forward draught of the horses. The ground and potatoes are then carried upward, and the former soon drop through the spaces between the teeth, but the potatoes are carried up higher, until they reach the widest space $a$, when they drop out on top of the ground, and entirely free by themselves.

Should the teeth become clogged, or a stone or other obstruction be in their way, the driver at once raises the rear of the frame, and lifts it sufficiently high. In this motion, the rounded end $b$, of the frame, acts as a fulcrum, and the pivoted tongue permits of the upward motion, yet does not stop the forward movement of the apparatus. As soon as the teeth are cleared, the frame is allowed to drop, and the operation of digging continues.

While the frame carries or supports the teeth, it acts as runners, and steadies the motion of the apparatus, preventing its overturning, as well as relieving the driver of great labor.

Before the operation of digging commences, it is necessary that the vines be pulled.

In some sections of the country, the peach-blows are entirely raised. It is well known that they take deep root, and the operation of pulling the vines is quite laborious. To obviate this, I apply a series of pulling-teeth, H, fig. 2, to the same frame A, and attach them to a metallic plate, similar to plate F, fig. 1. The digging-teeth G, and their plate, are of of course removed, and the teeth H substituted therefor. As each vine is pulled, the frame is to be raised to clear the teeth before another vine is reached. There is thus no clogging of said teeth, and the apparatus moves easily along. When stones or other obstructions are in the way of the teeth, the frame is raised, and operated as in the previous case.

Should one or more of either set of teeth break or wear out, others may be readily substituted, by merely removing the old ones, and riveting the new ones in their places. It will be found that a simple and useful apparatus is produced, and one which can be manufactured cheaply, to be within reach of the humblest farmer.

Having thus described my invention,

What I claim as new, and desire to secure by Letters Patent, is—

1. The frame A, handles D, and draught-pole B, in combination with the teeth G or H, substantially as and for the purpose described.

2. The series of curved, tapering teeth G, arranged upon the adjustable plates F, as described, for the purposes of a potato-digger, substantially as described.

To the above, I have signed my name, this 15th day of October, 1868.

JOHN W. NEWTON.

Witnesses:
JOHN A. WIEDERSHEIM,
GEO. W. ROTHWELL.